D. M. FINLAYSON.
Journal-Bearing.
No. 205,256.   Patented June 25, 1878.
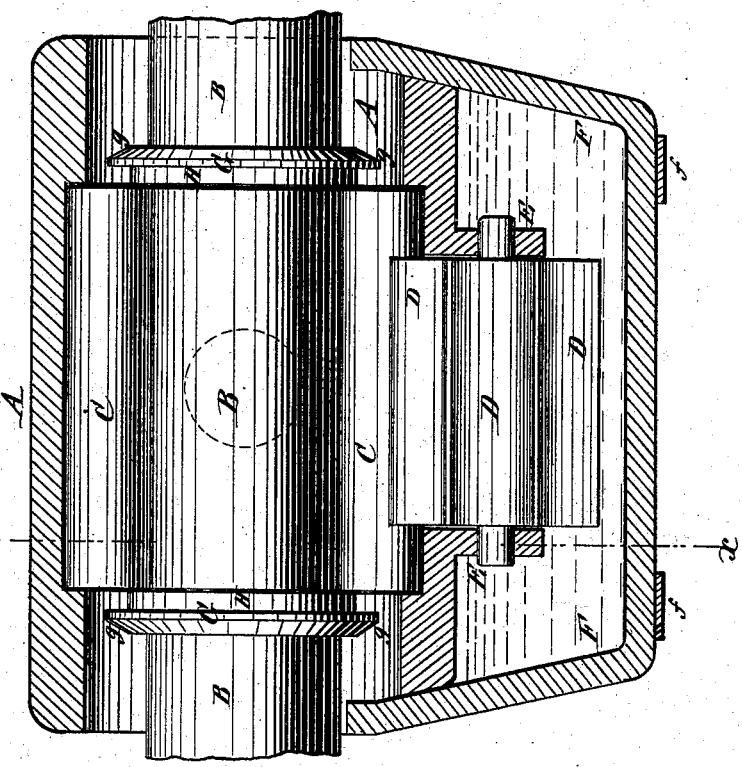
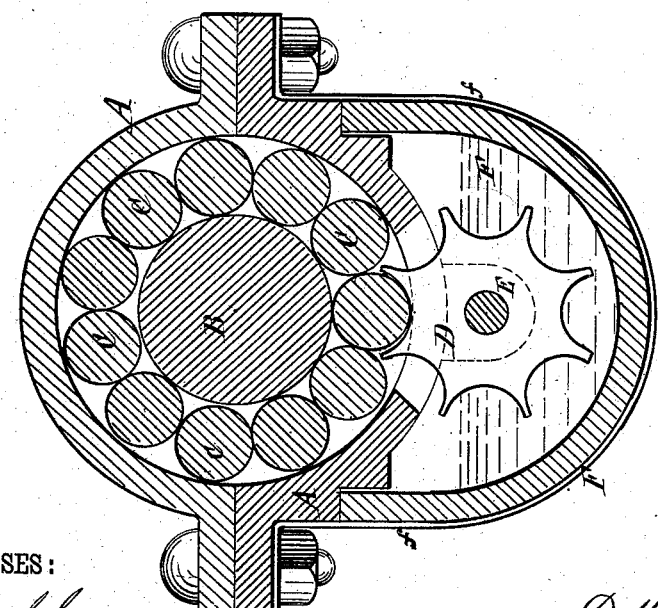
WITNESSES:
A. Schehl.
C. Sedgwick.
INVENTOR:
D. M. Finlayson
BY Munn & Co.
ATTORNEYS.

UNITED STATES PATENT OFFICE.

DAVID M. FINLAYSON, OF ST. PAUL, MINNESOTA.

IMPROVEMENT IN JOURNAL-BEARINGS.

Specification forming part of Letters Patent No. 205,256, dated June 25, 1878; application filed May 16, 1878.

*To all whom it may concern:*

Be it known that I, DAVID M. FINLAYSON, of St. Paul, in the county of Ramsey and State of Minnesota, have invented a new and Improved Journal-Bearing, of which the following is a specification:

The object of my invention is to provide an improved mode of supporting and lubricating journals in their bearings, so as to reduce the friction between them to a minimum.

The invention consists in the combination, with a journal and its bearing, of a series of rollers surrounding the journal, and interposed between its surface and that of the inside of the bearing, said rollers being kept parallel with the journal by a pinion parallel with the axis of the journal, and gearing with the surfaces of the rollers, said pinion being mounted in bearings in the oil-box underneath the journal, and also acting as lubricator to the rollers, and through them to the journal, as will be hereinafter described.

In the accompanying drawings, Figure 1 represents a vertical cross-section of my improved journal-bearing, the section being taken on the line $x\ x$ of Fig. 2. Fig. 2 is a vertical longitudinal section of the same.

Similar letters of reference indicate corresponding parts.

The invention is adapted for all kinds of journal-bearings, most especially for car-journal boxes.

The drawings represent a journal-box for ordinary line-shafting.

A is the journal-bearing. B is the journal. C are the rollers interposed between the journal and bearing, and the surfaces of which together form the working-surface for the journal, thereby converting the sliding friction usual in bearings to the far less friction between rolling-surfaces.

D is a pinion mounted in bearings E in the oil-box F, in a position parallel with the axis of the journal, and gearing with the surfaces of the smooth rollers C. The pitch of the pinion D is a little larger than the diameter of the rollers C, so that each roller, as it comes around, will strike the point of cog of the pinion, and, caught by that, be brought into line with the axis of the journal before it can pass.

The pinion D revolves in the oil in the box F, and consequently conveys the oil to the rollers C, which latter again distribute it upon the journal B and the inside of the bearing A, thus keeping up a constant lubrication without waste of oil, as the latter flows back again into the receptacle F.

G are collars, made of tempered steel, and pressed onto the journal to give a larger and more durable surface to resist the end-thrust of the journal. Each collar G is provided with one or more annular flanges $g$, so as to form a groove, H, outside of the ends of the rollers C, to intercept and lead back to the oil-cup F any oil that may have worked out at the end of the rollers C. The front end of the box A, if a car-axle box, is cast whole, except only a small aperture for the introduction of oil, and which is provided with a sheet-iron cap to keep out dust.

By this invention a journal is effectively oiled without the use of cotton waste or packing. The oil-box F is fastened to the lower half of the bearing A by straps $f$, secured by the same bolts and nuts which hold the two halves of the bearing together.

Having thus fully described my invention, I claim as new and desire to secure by Letters Patent—

1. The combination, with the journal and bearing B A, of the series of rollers C, surrounding the journal, and interposed between its surface and that of the inside of the bearing, said roller being kept in axial line with the journal by the lubricating-pinion D, mounted in bearings E in the oil-box F, substantially as and for the purpose set forth.

2. The pinion D, in combination with the rollers C, the journal B, and the bearing A, to keep the rollers parallel with the axis of the journal, substantially as specified.

3. The pinion D, in combination with the oil-box and the rollers C, for the purpose of lubrication, substantially as specified.

DAVID M. FINLAYSON.

Witnesses:
H. H. KENYON,
A. M. BELL.